United States Patent [19]

Gulbenk

[11] 3,755,338

[45] Aug. 28, 1973

[54] 4-AMINO-6-BROMO-3,5-DICHLOROPICOLINIC ACID COMPOUNDS

[75] Inventor: Alin H. Gulbenk, Walnut Creek, Calif.

[73] Assignee: The Dow Chemical Company, Midland, Mich.

[22] Filed: Dec. 17, 1970

[21] Appl. No.: 99,304

[52] U.S. Cl............ 260/295 R, 260/270 R, 424/266
[51] Int. Cl.............................................. C07d 31/36
[58] Field of Search ..................... 260/270 R, 295 R

[56] References Cited
UNITED STATES PATENTS
3,285,925  11/1966  Johnston et al............. 260/295 R X
3,296,272  1/1967  Johnston ..................... 260/294.8 F

*Primary Examiner*—Alan L. Rotman
*Attorney*—Griswold & Burdick, S. Preston Jones and C. Kenneth Bjork

[57] ABSTRACT

Compounds corresponding to the formula

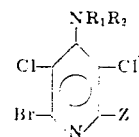

wherein $R_1$ and $R_2$ independently represents hydrogen or loweralkyl of one to four carbon atoms; Z represents carboxylic acid (—COOH), carboxylic acid amide (—CONR$_1$R$_2$ wherein $R_1$ and $R_2$ independently represents hydrogen or loweralkyl of one to four carbon atoms), carboxylic acid salt (—COOM wherein M represents alkali metal, alkaline earth metal, copper, iron, zinc, cobalt, nickel and ammonium) or carboxylic acid ester (—COOR wherein R represents loweralkyl of one to four carbon atoms) are prepared and are useful as fungicides and algaecides.

2 Claims, No Drawings

4-AMINO-6-BROMO-3,5-DICHLOROPICOLINIC ACID COMPOUNDS

SUMMARY OF THE INVENTION

The present invention is directed to compounds corresponding to the formula

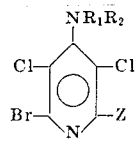

(Formula I)

In this and succeeding formulae, $R_1$ and $R_2$ independently represents hydrogen or loweralkyl of one to four carbon atoms; Z represents carboxylic acid (—COOH), carboxylic acid amide (—CONR$_1$R$_2$ wherein $R_1$ and $R_2$ are as hereinabove defined), carboxylic acid salt (—COOM wherein M represents alkali metal, alkaline earth metal, copper, iron, zinc, cobalt, nickel and ammonium) or carboxylic acid ester (—COOR wherein R represents loweralkyl of one to four carbon atoms).

The compounds of the present invention are crystalline solids or liquids, generally of low solubility in water and of low to moderate solubility in common organic solvents such as acetone, xylene, and benzene.

The compounds of the present invention are useful as fungicides and algaecides.

The products of the present invention wherein Z in Formula I is —COOH are prepared by treating the corresponding 4-amino-3,5,6-trichloropicolinic acid with anhydrous hydrogen bromide in glacial acetic acid.

In carrying out this reaction, the starting 4-amino-3,5,6-trichloropicolinic acid is added to the glacial acetic acid and the mixture heated to reflux. The hydrogen bromide, as a gas, is passed therein while the mixture is at the reflux temperature.

The product is thereafter poured into cold water and the solid which precipitates recovered by filtration or other conventional separatory procedure and washed. The product is purified by dissolving it in a dilute alkaline solution such as 10 percent sodium hydroxide and re-precipitated by acidifying with hydrochloric acid. The product is recovered by filtration and dried.

The compounds of the present invention wherein Z is —COOR are prepared by reacting the 6-bromo-3,5-dichloropicolinic acid, prepared as above, with an appropriate loweralkanol such as, for example, methanol, ethanol, propanol, isopropanol, butanol and t-butanol. The ester can be prepared by mixing the acid and alcohol together in the presence of an acid catalyst whereupon a reaction takes place with the formation of the desired 4-amino-6-bromo-3,5-dichloropicolinate ester product. Gaseous hydrogen chloride is conveniently employed as a catalyst, although other acids such as sulfuric acid, nitric acid, phosphoric acid, p-toluenesulfonic acid and oxalic acid may be added in catalytic amounts to the reaction mixture. Excess alcohol may also be employed to serve as reaction medium. The reaction takes place over a temperature in the range of from about 10° C. to about 150° C. or the boiling point of alcohol reactant or solvent. The amounts of the reactants are not critical but the reaction is facilitated by employing an excess of alcohol. The time is not critical and depends to some extent on the reaction temperature.

In a preferred method for carrying out the reaction, the appropriate 4-amino-6-bromo-3,5-dichloropicolinic acid compound and the appropriate alcohol are mixed together and gaseous hydrogen chloride added thereto while maintaining the temperature below about 20° C. until the reaction mixture is saturated with hydrogen chloride. The mixture is then allowed to warm to room temperature and kept at room temperature for several hours, conveniently overnight. Thereafter, the unreacted alcohol and hydrogen chloride are removed by vaporization and the desired 4-amino-6-bromo-3,5-dichloropicolinate ester product recovered by conventional procedures.

The compounds of the present invention wherein Z is —COOM are prepared by the reaction of the appropriate 4-amino-6-bromo-3,5-dichloropicolinic acid compound with the appropriate metal or ammonium -hydroxide or -amine or ammonia. In carrying out the reaction, substantially equivalent proportions of the acid and base are mixed together in a suitable solvent such as an alcohol-water mixture whereupon a reaction takes place with the formation of the desired salt product and water by-product. The salt may or may not be soluble in the reaction medium. If insoluble, it may be recovered by filtration; if soluble, it may be recovered by vaporizing off the solvent and water. The salt may be purified, if desired, by conventional methods.

Salts of metals which form difficultly soluble hydroxides, such as, for example, copper, may be prepared by an alternative procedure wherein an alkali metal salt of 4-amino-6-bromo-3,5-dichloropicolinic acid compound is reacted with a soluble mineral acid salt of said metal, such as the chloride or nitrate to produce the said metal salts of 4-amino-6-bromo-3,5-trichloropicolinic acid compound. In such preparation, substantially equivalent proportions of the alkali metal 4-amino-6-bromo-3,5-dichloropicolinate compound and said metal salt of a mineral acid are stirred together in water or a water-alcohol solvent at room temperature or with gentle warming for from 0.5 to several hours whereupon the desired metal salt of 4-amino-6-bromo-3,5-dichloropicolinic acid compound usually precipitates in the reaction mixture. The latter may be recovered by filtration and purified, if desired, by conventional procedures.

The compounds of the present invention wherein Z is —CONR$_1$R$_2$ are prepared by reacting an appropriate 4-amino-6-bromo-3,5-dichloropicolinate ester compound with an appropriate nitrogen base such as, for example, ammonia, a monoalkylamine or dialkylamine. The reaction may be carried out at a temperature of from about 15° C. to about 100° C. at atmospheric pressure or autogeneous pressure of the closed system. The amounts of the reactants are not critical; however, an excess of the ammonia or amine reactant is desirable. The reaction may be carried out in the presence of a solvent. Suitable solvents include alcohol or water or mixtures thereof. As a result of these steps the amide is obtained and may be recovered as residue by vaporizing off the solvent and/or unreacted nitrogen base. The product may then be purified by conventional procedures.

In carrying out the reaction, 4-amino-6-bromo-3,5-dichloropicolinate ester compound and appropriate nitrogen base are mixed together in an aqueous or alcoholic solvent and the resulting mixture heated at reflux temperature for several minutes whereupon a reaction takes place with the formation of the amide compound of 4-amino-6-bromo-3,5-trichloropicolinic acid. The mixture is then poured into water to precipitate the amide as a solid or liquid and the latter is thereafter recovered by conventional procedures.

The compounds of the present invention may be prepared by adaptations of procedures known to the skilled in the art. Thus, it is to be understood that modifications or other methods known in the art for preparation of compounds having similar functional groups may be substituted for the above procedures.

The following examples illustrate the invention but are not to be construed as limiting.

Example I

4-Amino-6-bromo-3,5-dichloropicolinic acid

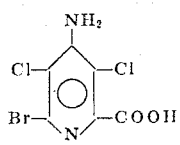

A mixture is prepared containing 50 grams (0.2 mole) of 4-amino-3,5,6-trichloropicolinic acid and 700 milliliters of glacial acetic acid. The mixture was heated to reflux and a stream of anhydrous hydrogen bromide passed therein for 2.5 hours. The mixture was allowed to stand overnight at room temperature. The mixture was again heated to reflux and additional anhydrous hydrogen bromide passed therein for 6 hours. The reaction product was poured into cold water and the crude solid 4-amino-6-bromo-3,5-dichloropicolinic acid product which precipitated was separated therefrom by filtration and washed with water. The product was purified by dissolving it in a 10 percent sodium hydroxide solution and re-precipitating it by acidifying it with hydrochloric acid. The product was recovered by filtration and dried under vacuum. The product had a melting point of 248°– ° C. and upon analysis was found to have carbon, hydrogen, chlorine, bromine and nitrogen contents of 25.3, 1.0, 25.1, 28.3 and 10.1 percent, respectively, as compared to the theoretical contents of 25.2, 1.1, 24.8, 28.0 and 9.8 percent, respectively, calculated for the above-named structure.

The following compounds of the present invention are prepared in accordance with the methods herein set forth.

4-Methylamino-6-bromo-3,5-dichloropicolinic acid having a molecular weight of 299.94 by the reaction of 4-methylamino-3,5,6-trichloropicolinic acid and hydrogen bromide;

4-Di-n-butylamino-6-bromo-3,5-dichloropicolinic acid having a molecular weight of 398.13 by the reaction of 4-di-n-butylamino-3,5,6-trichloropicolinic acid and hydrogen bromide;

4-Amino-6-bromo-3,5-dichloropicolinic acid:methyl ester having a molecular weight of 299.94 by the reaction of 4-amino-6-bromo-3,5-dichloropicolinic acid and methyl alcohol;

4-Isopropylamino-6-bromo-3,5-dichloropicolinic acid: butyl ester having a molecular weight of 384.10 by the reaction of 4-isopropylamino-6-bromo-3,5-dichloropicolinic acid and n-butyl alcohol;

4-Diethylamino-6-bromo-3,5-dichloropicolinic acid:ammonium salt having a molecular weight of 359.05 by the reaction of 4-diethylamino-6-bromo-3,5-dichloropicolinic acid and ammonia;

4-Amino-6-bromo-3,5-dichloropicolinic acid: sodium salt having a molecular weight of 307.90 by the reaction of 4-amino-6-bromo-3,5-dichloropicolinic acid and sodium hydroxide;

4-Amino-6-bromo-3,5-dichloropicolinic acid: calcium salt having a molecular weight of 324.92 by the reaction of 4-amino-6-bromo-3,5-dichloropicolinic acid and calcium hydroxide;

Cupric bis(4-amino-6-bromo-3,-5-dichloropicolinate)salt having acid:sodium molecular weight of 633.35 by the reaction of 4-amino-6-bromo-3,5-dichloropicolinic acid: salt and cupric chloride;

Ferric tris(4-amino-6-bromo-3,5-dichloropicolinate)salt having a molecular weight of 910.57 by the reaction of 4-amino-6-bromo-3,5-dichloropicolinic acid:sodium salt and ferric chloride;

Zinc bis(4-amino-6-bromo-3,5-dichloropicolinate)-salt having a molecular weight of 635.18 by the reaction of 4-amino-6-bromo-3,5-dichloropicolinic acid:-sodium salt and zinc chloride;

Nickel bis(4-amino-6-bromo-3,5-dichloropicolinate)salt having a molecular weight of 628.52 by the reaction of 4-amino-6-bromo-3,5-dichloropicolinic acid: sodium salt and nickel chloride;

Cobalt bis(4-amino-6-bromo-3,5-dichloropicolinate)salt having a molecular weight of 628.74 by the reaction of 4-amino-6-bromo-3,5-dichloropicolinic acid:sodium salt and cobalt chloride;

4-Amino-6-bromo-3,5-dichloropicolinamide having a molecular weight of 284.93 by the reaction of 4-amino-6-bromo-3,5-dichloropicolinic acid methyl ester and ammonia;

N-methyl-4-methylamino-6-bromo-3,5-dichloropicolinamide having a molecular weight of 31-0.97 by the reaction of 4-methylamino-6-bromo-3,5-dichloropicolinic acid methyl ester and methylamine; and N,N-dibutyl-4-dibutylamino-6-bromo-3,5-dichloropicolinamide having a molecular weight of 50-9.36 by the reaction of 4-dibutylamino-3,5-dichloropicolinic acid methyl ester and dibutylamine.

The compounds of the present invention can be employed as toxicants in pesticides for the control of various fungal organisms and algae. For such uses, the compounds can be employed in an unmodified form or dispersed on a finely divided solid and employed as a dust. Such mixtures can be also dispersed in water with or without the aid of a surface active agent and the resulting aqueous suspension or dispersion employed as a spray. In other procedures, the compounds can be employed as the active constituent in solvent solutions, oil-in-water or water-in-oil emulsions. The augmented compositions are adapted to be formulated as concentrates and subsequently diluted with additional liquid or solid adjuvants to produce the ultimate treating compositions. Good results are obtained when employing compositions containing pesticidal concentrations and usually from about 0.0001 to about 50 percent by weight or more.

In a representative operation, 4-amino-6-bromo-3,5-dichloropicolinic acid was found to give 100 percent kill and control of the organism *Chorella pyrinoidoso* and the fungal organism *Conifora putaena* when employed as the sole toxicant in a nutrient agar at a concentration of about 80 millimoles per liter of agar.

PREPARATION OF STARTING MATERIALS

The 4-amino-3,5,6-trichloropicolinic acid compounds employed as starting materials in the present invention are known compounds and can be prepared by the method taught in U.S. Pat. No. 3,285,925 wherein an appropriate 4-amino-2,3,5-trichloro-6-(trichloromethyl)- pyridine compound is heated at a temperature of from 80° C. to about 180° C. in a strong acid such as, for example, 80 percent sulfuric acid or concentrated phosphoric acid for a period of from 0.25 to 2 hours.

What is claimed is:

1. A compound corresponding to the formula 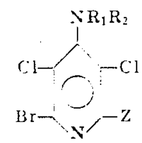 wherein $R_1$ and $R_2$ independently represent hydrogen or lower-alkyl of one to four carbon atoms; Z represents carboxylic acid (–COOH), carboxylic acid salt (–COOM wherein M represents alkali metal, alkaline earth metal, copper, iron, zinc, cobalt, nickel and ammonium) or carboxylic acid ester (–COOR wherein R represents loweralkyl of one to four carbon atoms).

2. The compound of claim 1 which is 4-amino-6-bromo-3,5-dichloropicolinic acid.

* * * * *

PO-1050
(5/69)

UNITED STATES PATENT OFFICE
CERTIFICATE OF CORRECTION

Patent No. __3,755,338__          Dated _____August 28, 1973__

Inventor(s) __Alin H. Gulbenk__

It is certified that error appears in the above-identified patent and that said Letters Patent are hereby corrected as shown below:

Column 3, line 45, insert --250-- after 248°-.

Column 4, line 16, delete "acid:sodium".

Signed and sealed this 26th day of February 1974.

(SEAL)
Attest:

EDWARD M.FLETCHER,JR.　　　　　　C. MARSHALL DANN
Attesting Officer　　　　　　　　　Commissioner of Patents